United States Patent
Xiao et al.

(10) Patent No.: US 9,753,523 B2
(45) Date of Patent: Sep. 5, 2017

(54) POWER SUPPLY SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xun-Yu Xiao, Wuhan (CN); Fang-Ta Tai, New Taipei (TW); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 91 days.

(21) Appl. No.: 14/683,385

(22) Filed: Apr. 10, 2015

(65) Prior Publication Data

US 2016/0274641 A1 Sep. 22, 2016

(30) Foreign Application Priority Data

Mar. 17, 2015 (CN) .......................... 2015 1 0115867

(51) Int. Cl.
*G06F 1/08* (2006.01)
*G06F 1/32* (2006.01)
*G06F 13/40* (2006.01)
*G06F 15/78* (2006.01)

(52) U.S. Cl.
CPC .......... *G06F 1/324* (2013.01); *G06F 13/4022* (2013.01); *G06F 1/08* (2013.01); *G06F 1/3287* (2013.01); *G06F 1/3296* (2013.01); *G06F 15/7807* (2013.01); *G06F 15/7832* (2013.01)

(58) Field of Classification Search
CPC .... G06F 1/324; G06F 1/3287; G06F 15/7807; G06F 15/7832
USPC .......................... 713/300, 310, 320, 322, 340
See application file for complete search history.

(56) References Cited

U.S. PATENT DOCUMENTS

| 2004/0153680 | A1* | 8/2004 | Miyake | ............. | H04L 12/40006 713/340 |
| 2010/0169701 | A1* | 7/2010 | Tu | .......................... | G06F 1/3203 713/600 |
| 2013/0179718 | A1* | 7/2013 | Jau | .......................... | G06F 1/263 713/340 |

* cited by examiner

*Primary Examiner* — Michael J Brown
(74) *Attorney, Agent, or Firm* — Steven Reiss

(57) ABSTRACT

A power supply system includes a power supply unit, a voltage converting unit, a comparison unit, and a switching unit. The power supply unit is configured to provide working voltage for a motherboard via a first resistor. The voltage converting unit includes a voltage converting chip. The voltage converting chip is configured to detect a first direct current (DC) voltage on the first resistor, and convert the first DC voltage to a second DC voltage. The comparison unit is configured to receive the second DC voltage, compare the second DC voltage with the working voltage, and output a switch signal. The switching unit is configured to receive the switch signal, and output a control signal to a central processing unit (CPU) on the motherboard according to the switch signal. The CPU is configured to adjust its frequency according to the control signal.

20 Claims, 2 Drawing Sheets

POWER SUPPLY SYSTEM

CROSS-REFERENCE TO RELATED APPLICATIONS

This application claims priority to Chinese Patent Application No. 201510115867.6 filed on Mar. 17, 2015, the contents of which are incorporated by reference herein in its entirety.

FIELD

The subject matter herein generally relates to a power supply system.

BACKGROUND

Personal computers usually have power supply units which provide direct current (DC) voltages to motherboards in the computers. The conventional motherboard can not adjust its electric power. The power supply unit needs to provide an electric power that is greater than the electric power of the motherboard.

BRIEF DESCRIPTION OF THE DRAWINGS

Implementations of the present technology will now be described, by way of example only, with reference to the attached figures.

DETAILED DESCRIPTION

Figure 1:
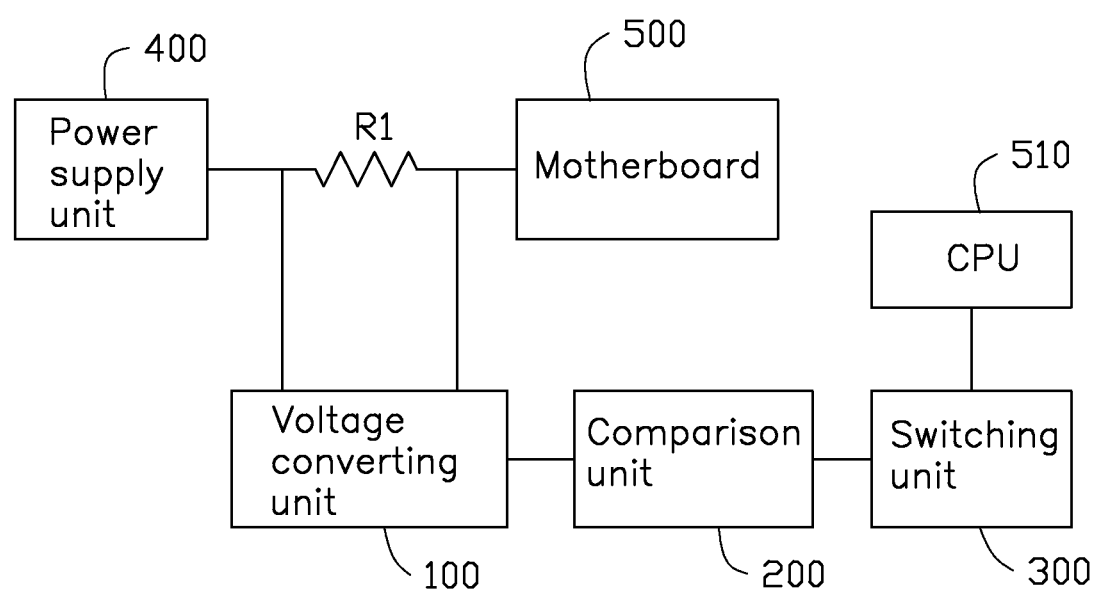
FIG. 1 is a block diagram of an embodiment of a power supply system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates a power supply system in accordance with one embodiment. The power supply system includes a voltage converting unit 100, a comparison unit 200, and a switching unit 300. The voltage converting unit 100 is configured to detect a working voltage of a power supply unit 400. The power supply unit 400 is configured to provide the working voltage for a motherboard 500 via a first resistor R1.

Figure 2:
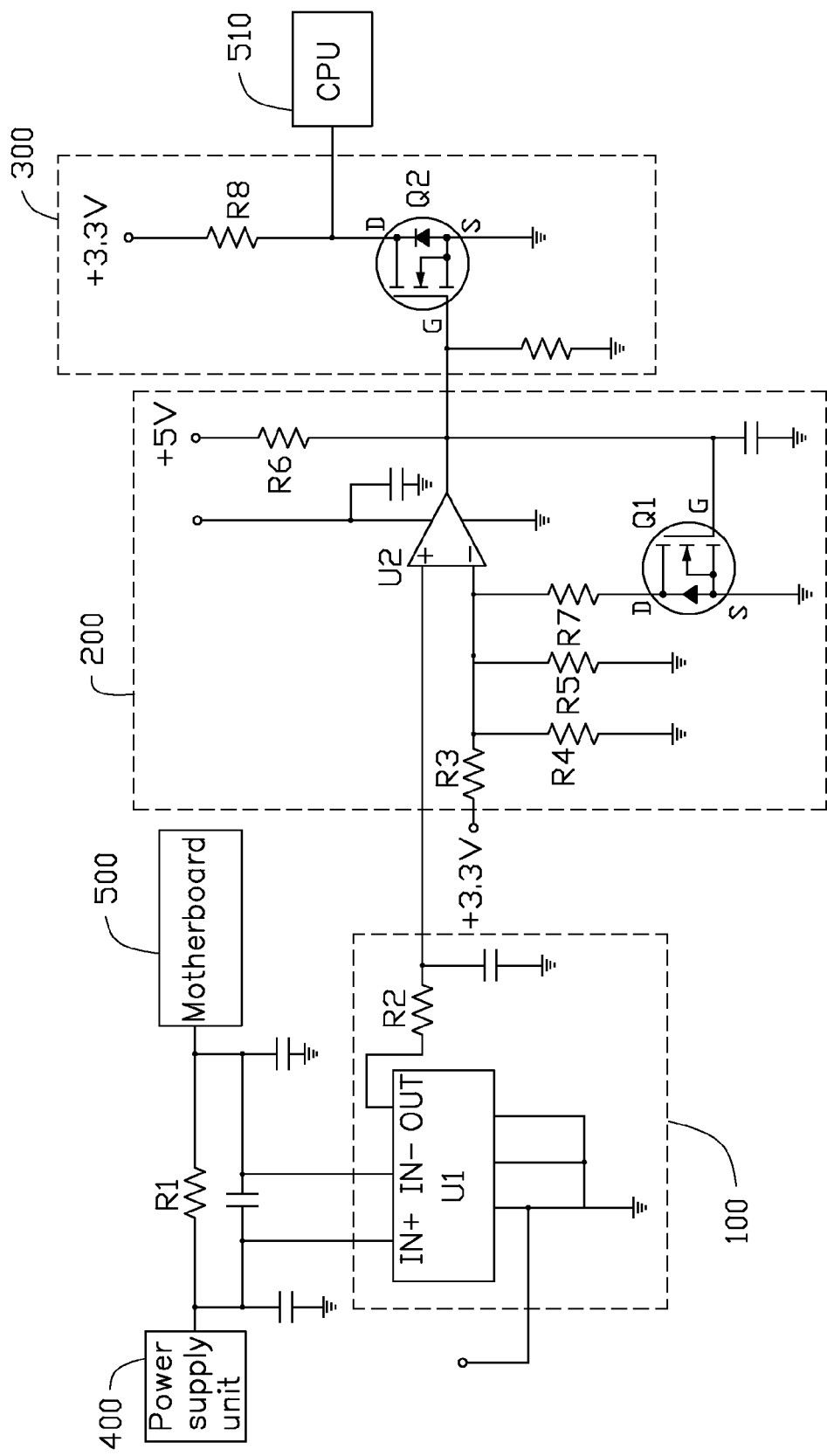
FIG. 2 is a circuit diagram of the power supply system of FIG. 1.

FIG. 2 illustrates that the voltage converting unit 100 includes a voltage converting chip U1. The voltage converting chip U1 includes a first voltage input terminal IN+, a second voltage input terminal IN−, and a voltage output terminal OUT. The first voltage input terminal IN+ is electrically coupled to a first terminal of the first resistor R1. The second voltage input terminal IN− is electrically coupled to a second terminal of the first resistor R1. The voltage converting chip U1 detects a first direct current (DC) voltage on the first resistor R1 by the first voltage input terminal IN+ and the second voltage input terminal IN−. The voltage converting chip U1 converts the first DC voltage to a second DC voltage which is output at the voltage output terminal OUT.

The comparison unit 200 includes a comparator U2 and a first switch Q1. The comparator U2 includes a non-inverting input terminal, an inverting input terminal, and an output terminal. The first switch Q1 includes a first terminal, a second terminal, and a third terminal. The non-inverting input terminal of the comparator U2 is electrically coupled to the voltage output terminal OUT of the voltage converting chip U1 via a second resistor R2. The inverting input terminal of the comparator U2 is configured to receive a third DC voltage via a third resistor R3. The inverting input terminal of the comparator U2 is grounded via a fourth resistor R4 and a fifth resistor R5 respectively. The output terminal of the comparator U2 is configured to receive a fourth DC voltage via a sixth resistor R6. The output terminal of the comparator U2 is electrically coupled to the first terminal of the first switch Q1.

The second terminal of the first switch Q1 is grounded. The third terminal of the first switch Q1 is electrically coupled to the inverting input terminal of the comparator U2 via a seventh resistor R7. The third DC voltage is configured to generate a reference voltage at the inverting input terminal of the comparator U2 by the third resistor R3, the fourth resistor R4, the fifth resistor R5, and the seventh resistor R7. The non-inverting input terminal of the comparator U2 is configured to receive the second DC voltage via the second resistor R2. The comparator U2 compares the second DC voltage with the reference voltage and outputs a switch signal at the output terminal of the comparator U2.

In at least one embodiment, the first switch Q1 is an n-channel metal-oxide-semiconductor field-effect transistor (MOSFET), and the first terminal, the second terminal, and the third terminal of the first switch Q1 are respectively gate, source, and drain. The third DC voltage is +3.3 volts, and the fourth DC voltage is +5 volts.

The switching unit 300 includes a second switch Q2. The second switch Q2 includes a first terminal, a second terminal, and a third terminal. The first terminal of the second switch Q2 is electrically coupled to the output terminal of the comparator U2. The second terminal of the second switch Q2 is grounded. The third terminal of the second switch Q2 is configured to receive the third DC voltage via an eighth resistor R8. The third terminal of the second switch Q2 is electrically coupled to a central processing unit (CPU) 510 on the motherboard 500. The first terminal of the second switch Q2 is configured to receive the switch signal. The third terminal of the second switch Q2 is configured to output a control signal to the CPU 510 according to the switch signal.

In at least one embodiment, the second switch Q2 is an n-channel MOSFET, and the first terminal, the second terminal, and the third terminal of the second switch Q2 are respectively gate, source, and drain.

In use, the voltage converting chip U1 detects the first DC voltage on the first resistor R1 and converts the first DC voltage to the second DC voltage. The comparator U2 receives the second DC voltage and compares the second DC voltage with the reference voltage.

When the working voltage output from the power supply unit 400 to the motherboard 500 is over voltage, the second DC voltage is greater than the reference voltage. The output terminal of the comparator U2 outputs the switch signal at a high voltage level. The first terminal of the second switch Q2 receives the switch signal at the high voltage level. The second switch Q2 turns on. The third terminal of the second switch Q2 outputs the control signal at a low voltage level to the CPU 510. The CPU 510 decreases its working frequency according to the control signal at the low voltage level. The working voltage output from the power supply unit 400 is decreased, and the motherboard 500 can work normally.

When the working voltage output from the power supply unit 400 to the motherboard 500 is normal, the second DC voltage is less than the reference voltage. The output terminal of the comparator U2 outputs the switch signal at a low voltage level. The first terminal of the second switch Q2 receives the switch signal at the low voltage level. The second switch Q2 turns off. The third terminal of the second switch Q2 outputs the control signal at a high voltage level to the CPU 510. The CPU 510 retains a working frequency according to the control signal at the high voltage level. The working voltage output from the power supply unit 400 is retained, and the motherboard 500 can work normally.

In at least one embodiment, when the second DC voltage is greater than the reference voltage, the output terminal of the comparator U2 outputs the switch signal at the high voltage level. The first terminal of the first switch Q1 receives the switch signal at the high voltage level. The first switch Q1 turns on. The seventh resistor R7 is connected to the inverting input terminal of the comparator U2. The reference voltage generated by the third DC voltage is decreased. The comparator U2 will act slowly when the working voltage output from the power supply unit 400 to the motherboard 500 decreases suddenly.

In at least one embodiment, when the second DC voltage is less than the reference voltage, the output terminal of the comparator U2 outputs the switch signal at the low voltage level. The first terminal of the first switch Q1 receives the switch signal at the low voltage level. The first switch Q1 turns off. The seventh resistor R7 is not connected to the inverting input terminal of the comparator U2. The reference voltage generated by the third DC voltage is increased. The comparator U2 will act slowly when the working voltage output from the power supply unit 400 to the motherboard 500 increases suddenly.

The embodiments shown and described above are only examples. Many details are often found in the art such as the other features of a power supply system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply system comprising:
   a power supply unit configured to provide a working voltage for a motherboard via a first resistor;
   a voltage converting unit comprising a voltage converting chip configured to detect a first direct current (DC) voltage on the first resistor, and convert the first DC voltage to a second DC voltage;
   a comparison unit configured to receive the second DC voltage, compare the second DC voltage with the working voltage, and output a switch signal; and
   a switching unit configured to receive the switch signal, and output a control signal to a central processing unit (CPU) on the motherboard according to the switch signal, wherein the CPU is configured to adjust its frequency according to the control signal;
   wherein the comparison unit comprises a comparator and a first switch; the comparator comprises a non-inverting input terminal, an inverting input terminal, and an output terminal; the first switch comprises a first terminal, a second terminal, and a third terminal; the non-inverting input terminal of the comparator is electrically coupled to the voltage output terminal of the voltage converting chip via a second resistor; the inverting input terminal of the comparator is configured to receive a third DC voltage via a third resistor; the output terminal of the comparator is configured to receive a fourth DC voltage via a sixth resistor; the output terminal of the comparator is electrically coupled to the first terminal of the first switch; the second terminal of the first switch is grounded; and the third terminal of the first switch is electrically coupled to the inverting input terminal of the comparator via a seventh resistor.

2. The power supply system of claim 1, wherein the voltage converting chip comprises a first voltage input terminal, a second voltage input terminal, and a voltage output terminal; the first voltage input terminal is electrically coupled to a first terminal of the first resistor; and the second voltage input terminal is electrically coupled to a second terminal of the first resistor.

3. The power supply system of claim 2, wherein the voltage converting chip is configured to detect the first DC voltage on the first resistor by the first voltage input terminal and the second voltage input terminal, and convert the first DC voltage to the second DC voltage which is output at the voltage output terminal.

4. The power supply system of claim 2, wherein the inverting input terminal of the comparator is grounded via a fourth resistor and a fifth resistor respectively.

5. The power supply system of claim 4, wherein the third DC voltage is configured to generate a reference voltage at the inverting input terminal of the comparator by the third resistor, the fourth resistor, the fifth resistor, and the seventh resistor; the non-inverting input terminal of the comparator is configured to receive the second DC voltage via the second resistor; and the comparator compares the second DC voltage with the reference voltage and outputs the switch signal at the output terminal of the comparator.

6. The power supply system of claim 4, wherein the first switch is an n-channel metal-oxide-semiconductor field-effect transistor (MOSFET); and the first terminal, the second terminal, and the third terminal of the first switch are respectively gate, source, and drain.

7. The power supply system of claim 4, wherein the third DC voltage is +3.3 volts, and the fourth DC voltage is +5 volts.

8. The power supply system of claim 4, wherein the switching unit comprises a second switch; the second switch comprises a first terminal, a second terminal, and a third terminal; the first terminal of the second switch is electrically coupled to the output terminal of the comparator; the second terminal of the second switch is grounded; the third terminal of the second switch is configured to receive the third DC voltage via an eighth resistor; and the third terminal of the second switch is electrically coupled to the CPU.

9. The power supply system of claim 8, wherein the first terminal of the second switch is configured to receive the switch signal; and the third terminal of the second switch is configured to output the control signal to the CPU according to the switch signal.

10. The power supply system of claim 8, wherein the second switch is an n-channel MOSFET; and the first terminal, the second terminal, and the third terminal of the second switch are respectively gate, source, and drain.

11. A power supply system comprising:
a power supply unit configured to provide a working voltage for a motherboard via a first resistor;
a voltage converting unit comprising a voltage converting chip configured to detect a first direct current (DC) voltage on the first resistor, and convert the first DC voltage to a second DC voltage;
a comparison unit configured to receive the second DC voltage, compare the second DC voltage with the working voltage, and output a switch signal; wherein the comparison unit comprises a first switch; and
a switching unit configured to receive the switch signal, and output a control signal to a central processing unit (CPU) on the motherboard according to the switch signal, wherein the switching unit comprises a second switch; when the working voltage output from the power supply unit to the motherboard is over voltage, the second DC voltage is greater than a reference voltage, the comparison unit outputs the switch signal at a high voltage level, the first switch and the second switch receive the switch signal at the high voltage level, the first switch and the second switch turn on, the second switch output the control signal at a low voltage level to the CPU, and the CPU decreases its working frequency according to the control signal at the low voltage level; and when the working voltage output from the power supply unit to the motherboard is normal, the second DC voltage is less than the reference voltage, the comparison unit outputs the switch signal at a low voltage level, the first switch and the second switch receive the switch signal at the low voltage level, the first switch and the second switch turn off, the second switch output the control signal at a high voltage level to the CPU, and the CPU remains its working frequency according to the control signal at the high voltage level;
wherein the comparison unit further comprises a comparator; the comparator comprises a non-inverting input terminal, an inverting input terminal, and an output terminal; the first switch comprises a first terminal, a second terminal, and a third terminal; the non-inverting input terminal of the comparator is electrically coupled to the voltage output terminal of the voltage converting chip via a second resistor; the inverting input terminal of the comparator is configured to receive a third DC voltage via a third resistor; the output terminal of the comparator is configured to receive a fourth DC voltage via a sixth resistor; the output terminal of the comparator is electrically coupled to the first terminal of the first switch; the second terminal of the first switch is grounded; and the third terminal of the first switch is electrically coupled to the inverting input terminal of the comparator via a seventh resistor.

12. The power supply system of claim 11, wherein the voltage converting chip comprises a first voltage input terminal, a second voltage input terminal, and a voltage output terminal; the first voltage input terminal is electrically coupled to a first terminal of the first resistor; and the second voltage input terminal is electrically coupled to a second terminal of the first resistor.

13. The power supply system of claim 12, wherein the voltage converting chip is configured to detect the first DC voltage on the first resistor by the first voltage input terminal and the second voltage input terminal, and convert the first DC voltage to the second DC voltage which is output at the voltage output terminal.

14. The power supply system of claim 12, wherein the inverting input terminal of the comparator is grounded via a fourth resistor and a fifth resistor respectively.

15. The power supply system of claim 14, wherein the third DC voltage is configured to generate the reference voltage at the inverting input terminal of the comparator by the third resistor, the fourth resistor, the fifth resistor, and the seventh resistor; the non-inverting input terminal of the comparator is configured to receive the second DC voltage via the second resistor; and the comparator compares the second DC voltage with the reference voltage and outputs the switch signal at the output terminal of the comparator.

16. The power supply system of claim 14, wherein the first switch is an n-channel metal-oxide-semiconductor field-effect transistor (MOSFET); and the first terminal, the second terminal, and the third terminal of the first switch are respectively gate, source, and drain.

17. The power supply system of claim 14, wherein the third DC voltage is +3.3 volts, and the fourth DC voltage is +5 volts.

18. The power supply system of claim 14, wherein the second switch comprises a first terminal, a second terminal, and a third terminal; the first terminal of the second switch is electrically coupled to the output terminal of the comparator; the second terminal of the second switch is grounded; the third terminal of the second switch is configured to receive the third DC voltage via an eighth resistor; and the third terminal of the second switch is electrically coupled to the CPU.

19. The power supply system of claim 18, wherein the first terminal of the second switch is configured to receive the switch signal; and the third terminal of the second switch is configured to output the control signal to the CPU according to the switch signal.

20. The power supply system of claim 18, wherein the second switch is an n-channel MOSFET; and the first terminal, the second terminal, and the third terminal of the second switch are respectively gate, source, and drain.

* * * * *